US005444440A

United States Patent [19]

Heydendahl

[11] Patent Number: 5,444,440

[45] Date of Patent: Aug. 22, 1995

[54] OPERATING CIRCUITS FOR LOCKING DEVICE

[76] Inventor: Mark S. Heydendahl, 3049 W. Coolidge, No. 3, Anaheim, Calif. 92801

[21] Appl. No.: 120,196

[22] Filed: Sep. 13, 1993

Related U.S. Application Data

[63] Continuation of Ser. No. 878,821, May 5, 1992, abandoned.

[51] Int. Cl.[6] .......................... G06F 7/04; G08B 13/08

[52] U.S. Cl. ................................ 340/825.32; 340/547; 340/542

[58] Field of Search ................... 340/825.32, 547, 542; 116/85, 86

[56] References Cited

U.S. PATENT DOCUMENTS

| | | | |
|---|---|---|---|
| 2,388,182 | 10/1945 | Redding et al. | 49/199 |
| 2,607,586 | 8/1952 | Schlytern | 292/DIG. 36 X |
| 3,048,385 | 8/1962 | Reynolds | 49/199 X |
| 3,224,493 | 12/1965 | Houk | 49/280 X |
| 3,829,834 | 8/1974 | Frankland et al. | 292/144 X |
| 3,975,723 | 8/1976 | Bowling et al. | 340/547 |
| 4,074,269 | 2/1978 | Hartley | 340/825.32 X |
| 4,254,582 | 3/1981 | McGee | 292/DIG. 36 X |
| 4,258,358 | 3/1981 | Lee et al. | 340/547 X |
| 4,306,744 | 12/1981 | Krehbiel | 292/144 |
| 4,311,225 | 1/1982 | Tsubaki et al. | 116/86 X |
| 4,338,526 | 7/1982 | Martin et al. | 49/31 X |
| 4,360,801 | 11/1982 | Duhame | 49/31 X |
| 4,365,250 | 12/1982 | Matsuoka et al. | 340/825.32 |
| 4,404,558 | 9/1983 | Yen | 318/285 X |
| 4,463,292 | 7/1984 | Engelmann | 318/285 X |
| 4,464,651 | 8/1984 | Duhame | 49/31 X |
| 4,597,428 | 7/1986 | Iha | 49/199 X |
| 4,609,910 | 9/1986 | Geringer et al. | 49/31 X |
| 4,737,770 | 4/1988 | Brunius et al. | 340/539 |
| 4,771,218 | 9/1988 | McGee | 49/280 X |
| 4,819,379 | 4/1989 | Kenzelmann et al. | 49/280 |
| 4,866,422 | 9/1989 | Dunnett et al. | 340/539 |
| 4,976,477 | 12/1990 | Nakao | 292/201 |
| 5,012,455 | 4/1991 | Schwarz et al. | 49/31 X |
| 5,218,282 | 6/1993 | Duhame | 318/603 |

*Primary Examiner*—Thomas G. Black
*Assistant Examiner*—David Yiuk Jung
*Attorney, Agent, or Firm*—John J. Connors; Connors & Associates

[57] ABSTRACT

Operating circuits for a solenoid actuated locking means mounted interiorly of a garage door, to provide additional security. The operating circuits are electrically connected to the solenoid operator of a normally closed hasp that cooperates with the garage door in the closed position. The circuits are designed for use with an automatic garage door opener or a manually opened garage door, and include integrated circuit logic, relay logic, or equivalent means to allow opening of the garage door by authorized means, or if a forced attempt is made, or an unauthorized means is used, to open the garage door, when the garage door is in the secured position, the circuitry will activate an alarm, or other security means and prevent the garage door from being opened.

8 Claims, 5 Drawing Sheets

OPERATING CIRCUITS FOR LOCKING DEVICE

This is a continuation of application Ser. No. 07/878,821, filed on May. 5, 1992 now abandoned.

CROSS REFERENCE TO RELATED APPLICATIONS

This application is preferably used with and discloses apparatus described and claimed in the following related application:

application entitled LOCKING DEVICE FOR DOORS, Ser. No. 07/755,035, filed Sep. 4, 1991, in the name of MARK S. HEYDENDAHL, applicant herein now U.S. Pat. No. 5,152,560.

BACKGROUND OF THE INVENTION

1. Field of the Invention

This invention relates generally to electronic circuits for operating locking devices and more particularly to improved alarm/operating circuitry for use with locking means mounted interiorly of a door.

2. Description of Related Art

As described in copending application Ser. No. 07/755,035, now U.S. Pat. No. 5,152,560, the disclosure of which is incorporated herein in its entirety by this reference thereto, most closure means or doors have one or more locking or security devices to insure that the doors are not opened by unwanted persons seeking access to a home, garage, room or other area where access is to be restricted.

U.S. Pat. Nos. 2,470,285, 2,607,586, 2,800,348, 3,199,153, 3,996,591 and 4,170,374, discussed in copending application Ser. No. 07/755,035 now U.S. Pat. No. 5,152,560, show various circuits for use with or to operate closure means. While the prior art circuits disclosed in these patents provide some limited improvements in the locking and security art, there remains the need in the art for easy to install and repair, low-cost circuitry for use with currently existing or new doors, and which will dependably operate locking means and provide alarm circuitry therefor. The circuitry of the present invention provides operating means for security devices useful with automatic or manually operated garage doors, and includes alarm means to indicate if a person tries to force open a door having the circuitry of the present invention connected thereto.

SUMMARY OF THE INVENTION

Accordingly, it is a general object of the present invention to provide improved alarm/operating circuitry for door interior locking means. It is a particular object of the present invention to provide circuitry to operate an internal locking device for doors. It is a still more particular object of the present invention to provide simple to install and use circuitry which makes use of readily available elements, and which may be used alone or in conjunction with an automatic door opener. It is a still further object of the present invention to provide dependable electrical circuitry to actuate internal locking means for a garage door, and/or to activate an alarm, if improper entry is attempted. It is yet a further object of the present invention to provide an interlock and safety feature for an internal locking means on a door having an automatic opener.

In accordance with one aspect of the invention, there is provided electrical circuitry to operate a solenoid actuated hasp. The circuitry may take any desired form and may be tied in with new or existing alarm devices and/or automatic door openers. The circuitry includes means to allow a security device to be first opened and then the door which such security device locks to be fully opened. The circuitry also includes alarm means to indicate an unauthorized attempt to open, or forced opening of the door with the security device in the locked position.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
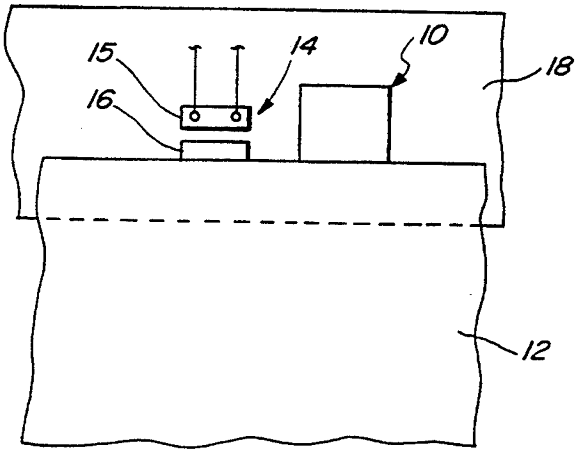
FIG. 1 is a partial plan view of the interior of a garage door having a solenoid operated hasp locking device mounted internally thereof, together with sensor switch means mounted on the top of the door and an adjacent area, cooperating with the operating circuitry for the solenoid.
Figure 2:
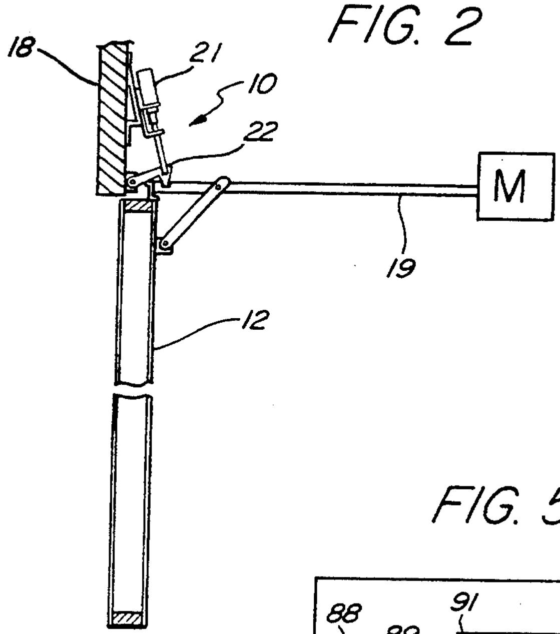
FIG. 2 is a side elevational view of the garage door of FIG. 1, having an automatic garage door opener connected thereto.

The following description is provided to enable a person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for improved alarm/operating circuitry for internal door locking means, such as, but not limited to, solenoid operated internal locking means of the type disclosed in applicant's copending application. The locking means may be mounted in any convenient location, internally of and adjacent the frame of the door, and is indicated generally by the numeral 10 in the attached drawings.

Although the elements of the alarm/operating circuitry may take any known or to be discovered form, the present invention is described hereinafter in connection with readily available switch means, conveniently either relays, solid state devices, or equivalent elements. Furthermore, although the circuitry is hereinafter discussed for use in operating internal locking means 10 mounted above the top of a garage door 12, of the tilt-up type, it is to be understood that the internal locking device could be easily placed in other positions, while the circuitry could be used in other applications, and/or with other types of doors or entrance closure means.

OPERATION

Basically, the circuitry disclosed herein is for authorized actuation of a solenoid operated latching means in the internal door locking means 10, for a garage or other door 12, to allow entry through the door; or, if forced entry of such door is attempted, with the interior locking means in the locked position, the interior lock will remain in the locked position, preventing entry, and an alarm function of the circuitry will be activated. The door may be the type that is opened manually, or by an automatic door opener of a type known to those skilled in the art.

As shown in FIGS. 1, and 3–4A, each circuit includes a door movement sensing means, such as sensor switch 14. The sensor switch means may take any known form, such as a magnetic switch, a spring loaded push button switch, or an optical sensor switch of the type shown in FIG. 5A. However, for purposes of illustration only, is shown and described as a magnetic switch 15 and a magnet 16 mounted on or adjacent the door 12 in any convenient position, such as, by way of example only, on the upper end of the door 12 and a header 18 above the door. The sensor switch 14 may be adjusted so as to be in the opened or closed position when the door is fully closed, depending on the specific circuitry used, as described more fully below. The voltage applied to the various elements of the circuitry is preferably stepped down and regulated from the line voltage in a garage or nearby structure by any known means, such as a power supply 11. Of course, if the building to be secured has no available electricity, the elements may be operated directly by a battery means of the required voltage. Furthermore, the circuitry may be provided with a back-up battery means, which would switch over, in a known manner, in case the line voltage or power supply 11 is cut off for any reason.

Upon movement of the door 12 a small distance, from the fully closed position toward the opened position, the switch means 14 is actuated, or moved from the open or closed position to the closed or opened position, as by magnet switch 15 being actuated by displacement of magnet 16. As is more fully described below, switch 14 is again opened or closed as the door 12 nears the fully closed position, when moving from the opened position.

When a door 12 having a locking means 10 operated by circuitry of the present invention connected thereto is opened by an individual user, the sequence of operation is as follows: a control means, such as a remote-control device 28, a push button, a key operated switch 72, or the like, is activated by the user so that the door may be opened; immediately after the door starts to open, the sensor switch means 14 will be closed or opened, depending on the circuitry used, to allow solenoid 21, in the internal door locking means 10, to be actuated by the solenoid driver 20 so as to pull up latch 22 and unlock the door. The garage door may then be moved to the fully opened position. However, if an individual user attempts to force open the garage door, without actuating the control means 28, 72, or the like, the solenoid 21 will not be actuated and the internal locking means 10 will remain in the locked position, preventing opening of the door. Furthermore, any such attempt to open the door will move the door enough to actuate the sensor switch 14. This attempt at opening the door resulting in the actuation of the sensor switch 14 will activate the alarm circuitry to sound a silent or other audible alarm, and/or advise a security service that forced entry is being attempted.

Figure 3:
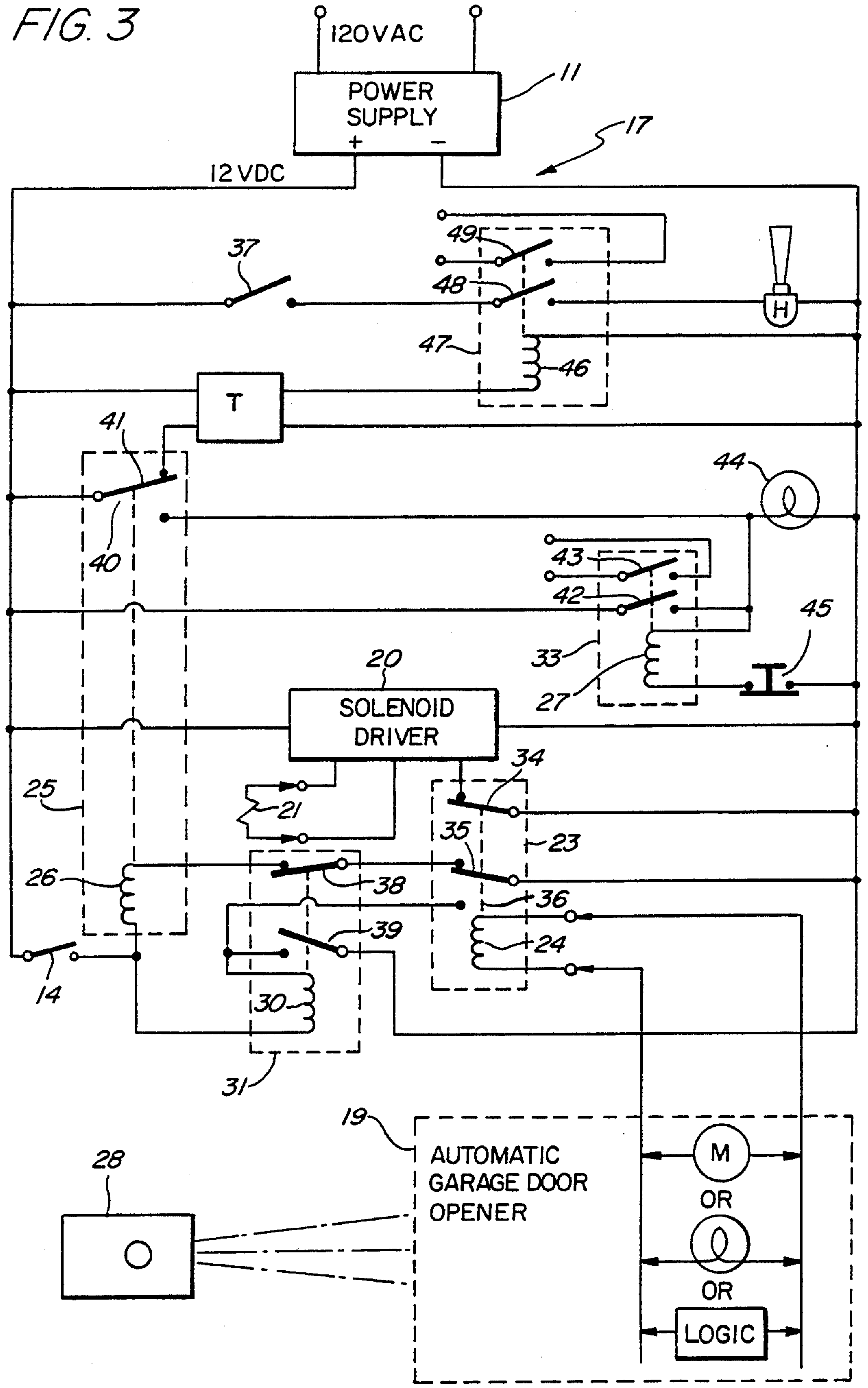
FIGS. 3 and 3A are schematic views of alarm/operating circuits, in their normal, rest, or starting positions, for use with the internal locking means on a door having an automatic opening means.
Figure 3A:
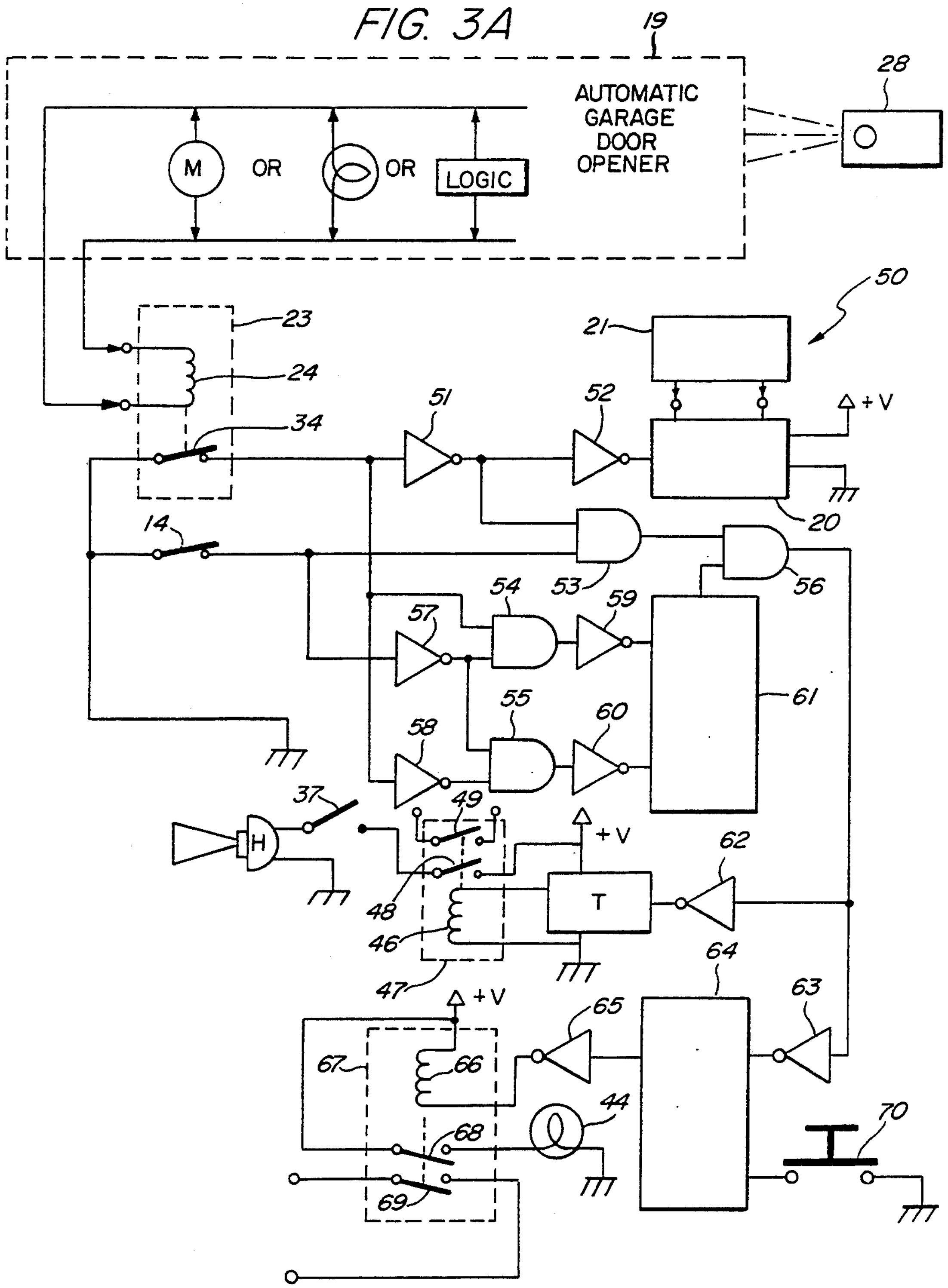
Figure 4:
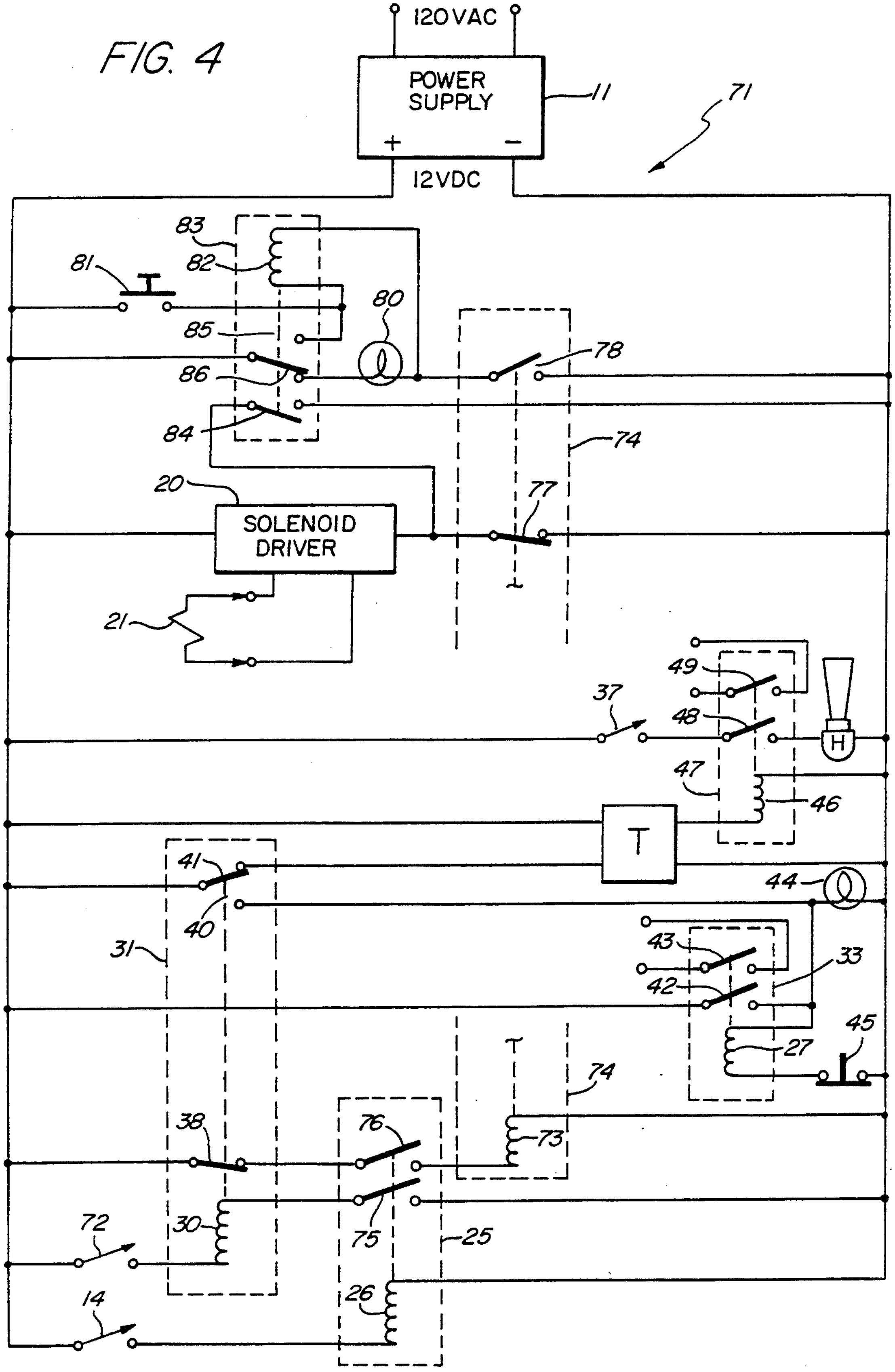
FIGS. 4 and 4A are schematic views of further embodiments of alarm/operating circuits, in their normal, rest, or starting positions, for use with the internal locking means on a door without an automatic opening means.
Figure 4A:
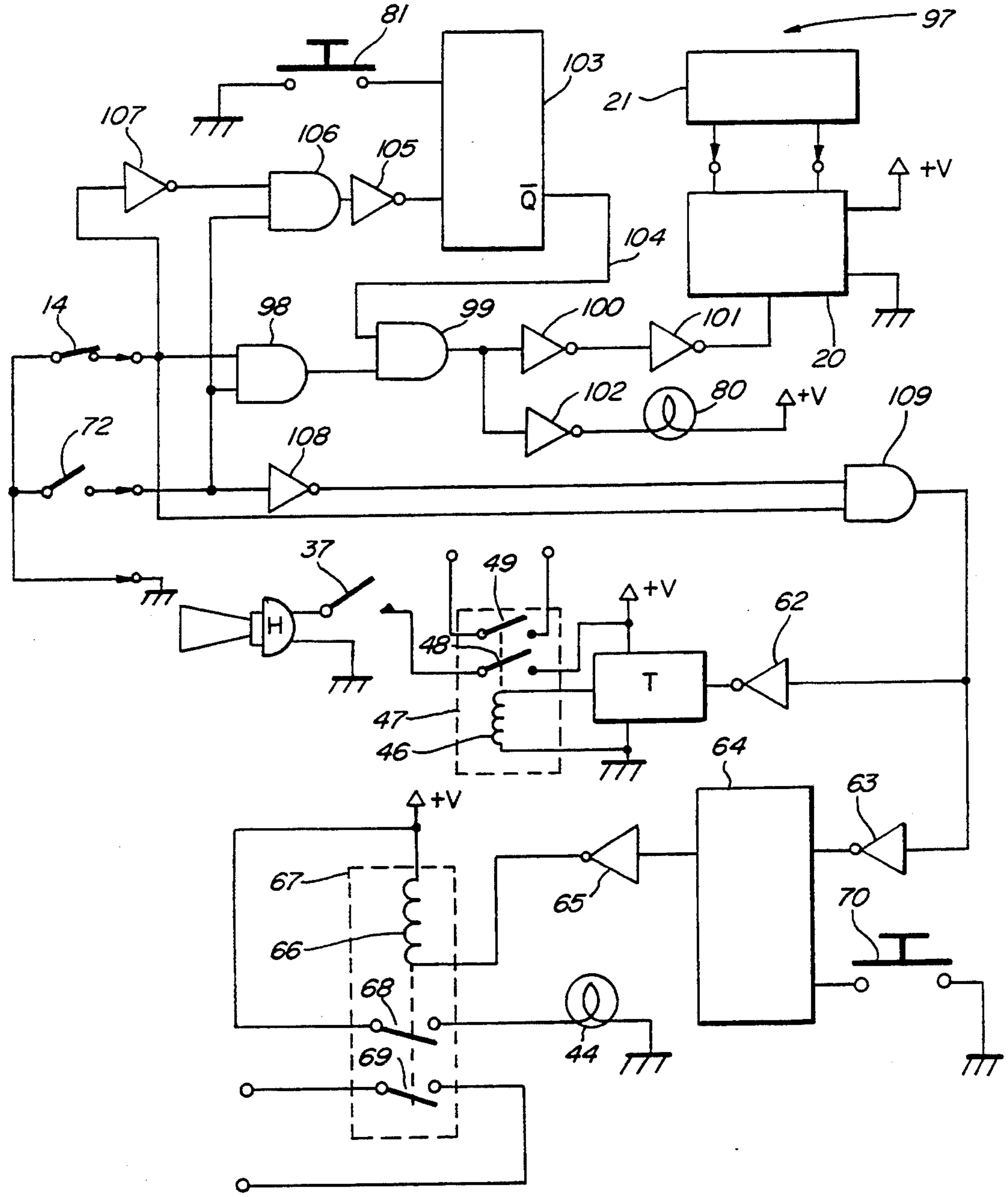

FIGS. 3 through 4A of the drawings, show preferred embodiments of circuits for securing and operating the garage door 12 in accordance with the present invention. The circuits in FIGS. 3 and 3A are preferably for use with a door having an automatic door opener 19, while the circuits of FIGS. 4 and 4A are preferably for use with a manually operable door. All of these circuits include movement sensor means 14 and means, such as a solenoid driver 20, to actuate the solenoid 21 to lift the latch 22, thereby unlocking the interior door lock 10. Further means, described below, are included to enable the alarm portion of each of the circuits to be selectively actuated if the circuitry senses that forced entry is being attempted. Each of the alarm circuits also includes a timer means T, to set a predetermined amount of time an alarm signal, such as a horn H, is sounded, and/or a signal is sent to a remote security means.

Figure 5:
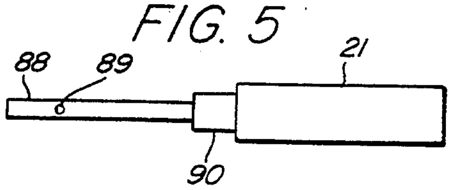
FIGS. 5 and 5A are schematic views of an interlock feature that may be added to the circuitry of FIGS. 3 and 3A, to prevent the operation of the motor of the automatic door opener, if the internal locking means is not unlocked.
Figure 5A:
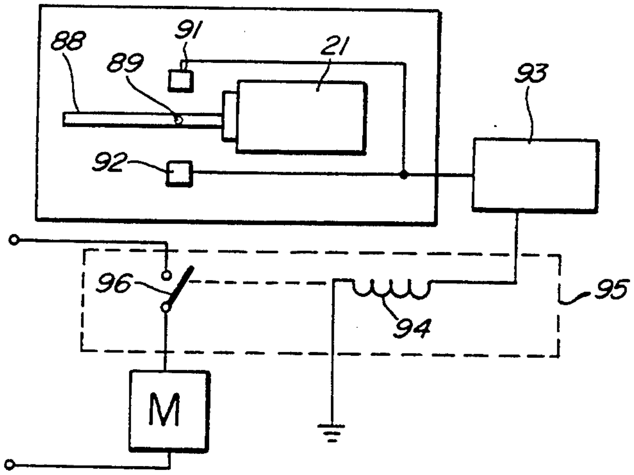

Turning now to FIG. 3, there shown is a circuit 17 consisting of a plurality of double pole relays, in which only some of the contacts are used, in their normal, rest or start positions, with the garage door down and the internal locking means 10 in the closed or locked position. A relay 23 has its coil 24 connected in parallel to a motor M, a light, or other logic of the automatic door opener 19, so as to be simultaneously actuated with the motor M when the garage door opener 19 receives the correct command from a remote control device 28, or some other control means located elsewhere, in a known manner. The motor M is of a type known to those skilled in the art and includes circuitry to operate the same so as to open and close the door 12 upon command. Upon actuation of the garage door opener 19, as by actuation of the remote control device 28, motor M of opener 19 will initiate movement of the door 12. Simultaneously, the coil 24 of relay 23 will be energized to open normally closed contacts 34 and 35, and close normally open contacts 36. Opening of contacts 34 will provide an input command to the solenoid driver 20 so as to actuate the solenoid 21 to unlock the latch 22 of internal locking means 10. If it is desired to prevent the motor M from operating when the latch 22 of the internal locking means 10 fails to open for any reason, an interlock or safety feature may be added to the circuitry. One type of interlock which may be used herein is shown in FIGS. 5 and 5A, and is described more fully below.

After the door 12 opens a small distance, preferably about one-quarter of an inch or so, the open switch 14 will be closed, as by displacement of the magnet 16 closing the open contacts of magnetic switch 15. Since normally open contacts 36 are closed, the closing of switch 14 will energize a coil 30 of relay 31, thus opening normally closed contacts 38 and closing normally open contacts 39. The motor M of automatic door opener 19 will continue to operate until the garage door is in the fully open position, where the power is cut off in a known manner, so that the motor M stops and the coil 24 of relay 23 is de-energized to return open contacts 34 and 35 to their normally closed position, while the closed contacts 36 will return to the normally open position and deactivate the solenoid 21. However, since switch 14 is still closed and contacts 39 closed, the coil 30 of relay 31 will remain energized thus keeping contacts 38 open to thereby prevent a further coil 26 of a relay 25 from being energized to activate the alarm circuit.

When it is desired to close the open garage door, the garage door opener motor M and relay 23 are energized simultaneously by automatic door opener 19 and the door begins to close. The contacts of relay 23 are again changed, as indicated above, so that contacts 34 and 35 open and contacts 36 close, and solenoid 21 will again be actuated to raise the interior lock latch 22. The door will be moved until it almost reaches the fully closed position (as described above), to open the closed switch 14. Opening of closed switch 14 will de-energize the coil 30 of relay 31 and allow the open contacts 38 to return to the normally closed position, and closed contacts 39 to return to the normally open position. The door will then move the final one-quarter of an inch or so until it is completely closed. When the door is completely closed, the motor M and the coil 24 of relay 23 will be de-energized, in a known manner, thus stopping the motor and allowing the contacts of relay 23 to return to their normal or resting positions, as described above, to thereby allow the solenoid 21 to release the latch 22 and again lock the door.

If the garage door 12 is in the closed position, with the interior lock in the latched position, and a person attempts to force open the garage door (i.e., without operating the garage door opener or other control means), the door will be allowed to move a small amount only, until the latch 22 prevents further movement. This small movement, however, will be enough to close the open switch 14. Closing of the switch 14, without energizing the garage door opener, will cause the coil 26 of the relay 25 to be energized, thereby closing normally open contacts 40, and opening normally closed contacts 41. Closing contacts 40 will in turn energize an alarm indicator light 44 and a coil 27 of a relay 33 to close parallel, normally open contacts 42 and 43, which will turn on any other alert means connected across contacts 43. Since the person attempting to open the garage door will be unable to do so because of the resistance of the internal locking means, the door will be released so as to fall back to its closed position, thereby opening switch 14 again. This will de-energize the coil 26 of relay 25 causing contacts 40 to open and contacts 41 to again close. However, the coil 27 of relay 33 will remain energized because contacts 42 are still closed. Closed contacts 42 will also keep on alarm indicator light 44 and closed contacts 43 will keep on any further alert means. Relay coil 27 will remain energized until an alarm reset button 45 is pressed to de-energize relay coil 27 and open contacts 42 and 43 so as to shut off the alarm indicator light 44 and any further alert means connected across contacts 43.

Simultaneously with energization of the coil 26 of relay 25 and opening of contacts 41, a timer means T receives an input. This input starts the timer and energizes a coil 46 of a relay 47. The energization of coil 46 closes normally open parallel contacts 48 and 49 to sound an alarm, such as horn H connected to contacts 48, if a switch 37 is also closed, as well as other remote alarms or security means connected to contacts 49. The timer T will operate until a predetermined period of time has passed. When timer T shuts off, the coil 46 of relay 47 will be de-energized to reopen contacts 48 and 49, thus shutting off the horn H and any remote alarms or security means, connected across contacts 49.

FIG. 3A illustrates a further circuit 50 that performs the same functions as FIG. 3, but which utilizes readily available solid state devices, such as "AND" gates, flip flops and inverters, to replace and carry out the same functions as the relays 25 and 31 of FIG. 3. Relay 23 is also connected to circuit 50 and is simultaneously energized with motor M by the automatic door opener 19. While motor M will continue to be operated in the same manner as discussed above in connection with FIG. 3, relay 23 only has normally closed contacts 34 connected into the circuit. Upon operation of the garage door opener 19, by actuation of the remote control device 28, motor M of opener 19 will initiate movement of the door 12 and the coil 24 of relay 23 will be simultaneously energized in the same manner as discussed above, to open normally closed contacts 34. Opening of contacts 34 will provide an input command to the solenoid driver 20, through inverters 51 and 52 so as to actuate the solenoid 21 to unlock the latch 22 of internal locking means 10.

After the door 12 opens a small distance, preferably about the one-quarter of an inch or so mentioned above, switch 14, which is here set so as to be in the closed position when the door is fully closed, will be opened, thus preventing the alarm portion of the circuitry from being activated. The motor M of automatic opener 19 will continue to operate until the garage door is in the fully open position, where the power is cut off, in a known manner, so that the motor M stops and the coil 24 of relay 23 is de-energized, thereby returning open contacts 34 to their normally closed position and deactivating the solenoid 21 so as to close latch 22.

When it is desired to close the open garage door, the garage door opener motor M and relay 23 are energized simultaneously by automatic door opener 19 and the door begins to close. The contacts of relay 23 are again changed, as indicated above, so that contacts 34 open and solenoid 21 will again be actuated to raise the interior lock latch 22. The door will be moved until it almost reaches the fully closed position where it will close the open switch 14, and then continue until the door is fully closed so that the motor stops and relay 23 is de-energized closing contacts 34.

When the garage door 12 is in the closed position, then contacts 34 are closed thereby sending a low level to an AND gate 54 and an inverter 58. Inverter 58 then inputs a high level to an AND gate 55. Also, when garage door 12 is closed, switch 14 is closed sending a low level to an inverter 57, which in turn inputs a high level to AND gates 54 and 55. Therefore, since only AND gate 55 receives two high levels, it inputs a high level to an inverter 60, which then places a low level on the "reset-not" input of a flip flop 61. This will cause output "Q-not" of flip flop 61 to be at a high level, which then goes to an AND gate 56. Additionally, since the interior lock 10 is in the latched position, if a person attempts to force open the garage door (without operating the garage door opener or other control means), the door will be allowed to move a small amount only, until the latch 22 prevents further movement. This small movement, however, will be enough to open the closed switch 14. Opening of the switch 14, without energizing the garage door opener, will cause an AND gate 53 to receive a second high level signal; i.e., one high signal from inverter 51 and the second high signal from the opening of switch 14. AND gate 53 now places a high signal to AND gate 56. When AND gate 56 receives the two high signals, from flip flop 61 and AND gate 53, it will in turn generate a forced entry detection signal which passes through an inverter 62 to timer T. This entry detection signal received by the timer T will start the timer T, which then energizes the coil 46 of the relay 47. The energization of coil 46 closes normally open parallel contacts 48 and 49 to sound an alarm, such as horn H, if the switch 37 is also closed, as well as other alarms or security means connected to contacts 49. The timer T will operate until a predetermined period of time has passed. The coil 46 of relay 47 will then be de-energized to reopen contacts 48 and 49, thus shutting off the horn H and any other remote security means connected to contacts 49.

Simultaneously with the receipt by the timer T of the forced entry detection signal from AND gate 56, this signal passes through an inverter 63 to set a further flip flop 64, to pass through another inverter 65, and actuate a further relay coil 66 of a relay 67 to close normally open contacts 68, 69 and turn on alarm indicator light 44 and any further alert means connected to contacts 69. Relay coil 66 will remain energized until an alarm reset push button 70 is pressed to de-energize coil 66 of relay 67 and open contacts 68 and 69, so as to shut off the alarm indicator light 44 and any further alert means connected to contacts 69.

FIGS. 5 and 5A show one embodiment of an interlock or safety feature for a door having an automatic garage door opener and utilizing the circuitry 17 and 50, described above. FIG. 5 shows the solenoid 21 in the rest or de-energized state. A bar 88 connected between the latch 22 (not shown) and the armature 90 of the solenoid 21 has a hole 89 passing entirely therethrough. FIG. 5A shows the solenoid in the energized state, with the latch 22 opened, in the unlocked position. Means is provided for detecting movement of the bar 88 and the hole 89 when the armature 90 is pulled into the solenoid. If the latch 22 is in the fully opened position (armature 90 drawn into the solenoid), the hole 89 will be aligned with sensing means which indicates that the latch is in the open, unlocked position. This sensing means may take any desired form, such as a light source or LED 91, which will shine through the aligned hole 89 onto an optical sensor 92, such as a photo transistor or a photo diode. Of course, if the hole 89 is not in the proper position, the sensor 92 will not detect LED 91 through hole 89, and the garage door motor will not be operated. However, if the latch 22 is in the fully opened position, light from LED 91 passes through the hole 89 and contacts the optical sensor 92 to thereby generate a signal to operate a switch means, such as photo-electric switch circuitry 93. The circuit 93 will in turn energize a coil 94 of a relay 95 to close normally open contacts 96 in the motor circuit and to thereby complete the circuit and allow operation of motor M.

Turning now to FIG. 4 of the drawing, there shown is a circuit 71 for the garage door 12, without an automatic door opener, motor M and relay 23. Otherwise, circuit 71 is substantially identical to circuit 17 of FIG. 3, so as to operate the solenoid driver 20 to actuate the solenoid 21 to lift the latch 22 and unlock the interior door lock 10. When the garage door 12 is to be opened, a remote switch device 72, located in any desired location, in a known manner, must be in, or moved to the open position, as shown in FIG. 4. This circuit 71, however, also includes further double pole relays 74 and 83, as well as relays 25 and 31, which operate in substantially the same manner as described above in connection with FIG. 3, but which are electrically connected in a slightly different manner and utilize some different contacts, to enable the alarm portion of the circuit to be selectively actuated if the circuitry senses that a forced entry is being attempted. The alarm portion of circuit 71 also includes the timer T, initiated by the relay 31, to operate the relay 47 to sound an alarm signal, such as the horn H, and/or send a signal to a remote security means, for a predetermined period of time.

When the garage door 12 is down with the interior locking means closed, the relays are in the positions shown in FIG. 4. Furthermore, if it is desired to open the garage door, the remote switch device 72 must be in the open position shown. Starting with the door closed and the switch 72 open, as shown, the door is the door closed and the switch 72 open, as shown, the door is opened the small distance of one-quarter of an inch or so specified above, until the normally open contacts of the switch 14 close. The closing of switch 14 will then energize the coil 26 of relay 25, thus moving normally open contacts 75, 76, connected in series, respectively, with the coil 30 of relay 31, and a coil 73 of the further relay 74, to the closed position. However, since switch 72 is open, the coil 30 of relay 31 will not be energized to trigger an alarm. When the open contacts 76 close, the coil 73 of relay 74 will be energized, to thereby open normally closed contacts 77, and close normally open contacts 78 (see top of FIG. 4, adjacent solenoid driver 20). Opening of contacts 77 will enable the solenoid driver 20 to energize solenoid 21 and open the locking means to allow the door to be moved to the fully open position. Furthermore, when contacts 78 close, a solenoid power "on" indicator light 80 will be energized. With the door in the fully open position, the power to the solenoid 21 and the indicator light 80 can be cut off by actuating a push button 81, which then energizes a coil 82 of the further relay 83 to close normally open contacts 84 (which causes solenoid driver 20 to de-energize solenoid 21, and allows solenoid 21 and latch 22 to return to their start positions), close normally open contacts 85 (which maintains power to coil 82 of relay 83 when push button 81 is released), and to open normally closed contacts 86 (shuts off light 80).

When it is desired to close the garage door again, the door is moved until the switch 14 is opened to de-energize the coil 26 of relay 25 and allow the contacts 75 and 76 to open. The opening of contacts 75 will effect no change in the circuit, but the opening of contacts 76 will de-energize coil 73 of relay 74 to close contacts 77 and open contacts 78. When contacts 77 close, this will keep the solenoid driver 20 from energizing solenoid 21 and when contacts 78 open the coil 82 of relay 83 will be deenergized. The de-energization of coil 82 will cause contacts 84, 85 and 86 to return to their normal or start positions, shown in FIG. 4. After the door is completely closed, the interior lock will again lock the door.

If the garage door 12 is in the closed and locked position, with the switch means 72 in the closed position, any person attempting to force open the garage door will move the door until the switch 14 contacts close thereby causing the coil 26 of relay 25 to be energized to close normally open contacts 75 and 76. Closed contacts 75 will now energize the coil 30 of relay 31 causing normally closed contacts 38 to open, thereby preventing coil 73 of relay 74 from being energized, and normally opened contacts 40 to be closed, to energize coil 27 of relay 33 so as to operate the alarm circuitry, and open normally closed contacts 41, so as to operate the timer in exactly the same manner as described above in connection with FIG. 3.

FIG. 4A illustrates a further circuit 97 that performs the same functions as FIG. 4, but which utilizes readily available solid state devices, such as "AND" gates, flip flops and inverters, to replace the relays 25, 31, 74 and 83 of FIG. 4, similar to those discussed above, in connection with FIG. 3. This circuit 97, although it operates in substantially the same manner as the circuits discussed above in connection with FIGS. 3A and 4, is electrically connected in a slightly different manner, to enable the alarm portion of the circuit to be selectively actuated if the circuitry senses that a forced entry is being attempted, as described above in FIG. 4.

When the circuit of FIG. 4A is used, and the garage door 12 is to be opened, remote switch device 72, must be in, or moved to the open position, as shown in FIG. 4A, and discussed above, in connection with FIG. 4. After the door 12 opens a small distance, preferably about one-quarter of an inch or so, switch 14, which is here set in the closed position, will be opened to actuate the solenoid driver 20 to energize solenoid 21, through AND gates 98, 99 and inverters 100, 101, while at the same time preventing the alarm portion of the circuitry from being activated. The door 12 may then be manually moved until it is in the fully open position. At the same time the solenoid is energized, the solenoid power "on" light 80 will be lit by a signal passing through an inverter 102 from AND gate 99. The solenoid 21 and the solenoid light 80 may be de-energized, in the same manner as described above in connection with FIG. 4, by pressing the solenoid power off button 81 to set a flip flop 103 and thus de-energize the solenoid 21 and lamp 80 through line 104 and AND gate 99.

When it is desired to close the open garage door, the door will be moved until it almost reaches the fully closed position, where it will close the open switch 14 to provide a low level signal to AND gate 98 that in turn will cause solenoid driver 20 to de-energize solenoid 21. The door is then moved until it is fully closed.

If the garage door 12 is in the closed and locked position, with the interior lock in the normal or latched position and the remote switch 72 in the closed position, and a person attempts to force open the garage door, the door will be allowed to move a small amount only, until the latch 22 prevents further movement. This small movement, however, will be enough to open the closed switch 14. Opening of the switch 14, will cause an AND gate 109 to receive a second high signal. When AND gate 109 receives the second high signal, it will generate a forced entry detection signal to inverters 62 and 63, which will then energize the timer and alarm portions of the circuit 97, in the same manner as discussed above in connection with FIG. 3A.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. An alarm system for a garage door, including
- an automatic garage door opener which upon being activated opens the garage door and is thereafter deactivated, and which upon being again activated closes the garage door and is thereafter deactivated,
- a sensor which is positioned near the garage door to detect movement of the garage door and which changes states from a first state to a second state upon detecting the garage door moving from a closed position and changes from said second state to said first state upon detecting the garage door moving from an open position to the closed position, and
- a control circuit for energizing an alarm including
  - an electrical device which is energized when the automatic garage door opener is activated to open or close the garage door to change from a first state to a second state, and when the automatic garage door opener is deactivated, is de-energized to change from the second state to the first state,
  - a logic circuit that is armed and disarmed,
  - said logic circuit being armed when the following sequence of events occur
    - (1) with the garage door open, the electrical device is energized,
    - (2) while the electrical device is energized, the sensor changes states from the second state to the first state by detecting the garage door moving from the open position to the closed position, and
    - (3) the automatic garage door opener is deactivated to change the state of the electrical device from the second state to the first state, and
  - said logic circuit being disarmed when the following sequence of events occur
    - (1) with the door closed, the automatic garage door opener is activated energizing the electrical device, and
    - (2) the sensor detects the garage door moving from the closed position and changes states from said first state to said second state, and
    - (3) the automatic garage door opener is deactivated, de-energizing the electrical device to change from the second state to the first state,
  - said logic circuit in the armed condition energizing the alarm when the closed garage door is moved, causing said sensor to change states from the first state to the second state prior to the electrical device being energized to change from the first state to the second state, and
  - said logic circuit in the armed condition not energizing the alarm when the closed garage door is moved by the automatic garage door opener, simultaneously activating the electrical device prior to said sensor changing from said first state to said second state.

2. The alarm system of claim 1 where the sensor is positioned so that a small movement of the garage door results in a change of state.

3. The alarm system of claim 1 including a latching mechanism which is automatically unlatched when the garage door is opened upon activation of the automatic garage door opener.

4. A door opening apparatus, including
- an automatic door opener which upon being activated opens or closes the door and is thereafter deactivated,
- a sensor element near the door which provides a signal indicating that the door has been moved from the closed position, and
- a circuit including an electrical device energized each time the automatic door opener is activated and de-energized each time the automatic garage door opener is deactivated, and an alarm subcircuit connected to the electrical device which is enabled each time the electrical device is de-energized upon closure of the door, which is activated by said signal to energize an alarm, and which is disabled to prevent operation of the alarm when the electrical device is energized before the sensor element detects door movement from the closed position.

5. The door opening apparatus of claim 4 where the sensor is positioned so that a small movement of the garage door results in the alarm being energized.

6. The door opening apparatus of claim 4 including a latching mechanism which is automatically unlatched when the door is opened upon activation of the automatic door opener.

7. An alarm system for a garage door, including an alarm, an automatic garage door opener having a manually operable actuator that upon actuation activates the garage door opener to move the garage door between closed and open positions, a sensor which is positioned near the garage door to detect movement of the garage door and which provides a control signal upon detection of garage door movement from the closed position, an alarm producing circuit connected to the alarm and responsive to the control signal to turn on said alarm, and a logic circuit connected to the alarm producing circuit, said logic circuit being automatically armed to enable the control signal to activate said alarm producing circuit when the garage door is moved from the closed position other than by actuation of the automatic garage door opener, and being automatically disarmed to disable the control signal from activating said alarm producing circuit when the automatic garage door opener is activated prior to movement of the garage door from the closed position.

8. An alarm system for a garage door, including an alarm which is normally de-energized and upon being energized produces a warning signal that an intruder is forcing open the garage door which is in a closed position, an automatic garage door opener having a manually operable actuator that upon actuation activates the garage door opener to move the garage door between closed and open positions, a sensor which detects movement of the garage door from the closed position and produces a control signal indicating such movement, an alarm producing circuit connected to the alarm for energizing the alarm, and means for selectively arming and disarming the alarm producing circuit, said arming and disarming means arming said alarm producing circuit automatically upon actuating the actuator and closure of the garage door by use of said actuator and disarming said alarm producing circuit when the manually operable actuator is actuated to open the garage door prior to movement of the garage door from the closed position as indicated by said control signal.

* * * * *